(12) United States Patent
Afrasiabi et al.

(10) Patent No.: US 12,597,233 B2

(45) Date of Patent: Apr. 7, 2026

(54) SYSTEM AND METHOD FOR TRAINING A MACHINE LEARNING MODEL

(71) Applicant: The Boeing Company, Arlington, VA (US)

(72) Inventors: Amir Afrasiabi, Fircrest, WA (US); Sina Rafati, Cedar Park, TX (US); Matthew David Johnson, Bryn Mawr, PA (US)

(73) Assignee: The Boeing Company, Arlington, VA (US)

( * ) Notice: Subject to any disclaimer, the term of this patent is extended or adjusted under 35 U.S.C. 154(b) by 391 days.

(21) Appl. No.: 18/183,030

(22) Filed: Mar. 13, 2023

(65) Prior Publication Data

US 2024/0249500 A1 Jul. 25, 2024

Related U.S. Application Data

(60) Provisional application No. 63/481,151, filed on Jan. 23, 2023.

(51) Int. Cl.
　　*G06V 10/26* (2022.01)
　　*G06V 10/74* (2022.01)
　　(Continued)

(52) U.S. Cl.
　　CPC .......... *G06V 10/7625* (2022.01); *G06V 10/26* (2022.01); *G06V 10/761* (2022.01); *G06V 10/7715* (2022.01); *G06V 10/82* (2022.01)

(58) Field of Classification Search
　　CPC .. G06V 10/7625; G06V 10/26; G06V 10/761; G06V 10/7715; G06V 10/82; G06V 10/25; G06V 10/765; G06V 10/774
　　See application file for complete search history.

(56) References Cited

U.S. PATENT DOCUMENTS

2020/0134510 A1* 4/2020 Basel .................... G06F 16/285
2021/0089841 A1* 3/2021 Mithun .................... G06T 7/90
　　　　　　　(Continued)

OTHER PUBLICATIONS

Hossain et al., Machine Learning Model Optimization with HyperParameter Tuning Approach, 2021, Global J. of Comp. Scie. and Tech. D. Neural & Artificial Intelligence , 21(2): 1-8. (Year: 2021).*

(Continued)

*Primary Examiner* — Kathleen M Broughton

(74) *Attorney, Agent, or Firm* — Alleman Hall LLP

(57) ABSTRACT

A computing system is configured to collect input data related to at least a portion of an object or an environment from the input sensor, execute a feature extractor to extract features for data elements of the input data, execute a clustering model configured to cluster the data elements of the input data into feature clusters based on similarities of the extracted features to each other, label a target clusters of the feature clusters and data elements of the target clusters with respective predetermined labels, generate a training dataset including the data elements of the target clusters, and train a machine learning model using the training dataset to predict a label for an inference time input data element at inference time. The respective predetermined labels of the target clusters correspond to prediction labels of the machine learning model.

20 Claims, 12 Drawing Sheets

(51) Int. Cl.
   G06V 10/762       (2022.01)
   G06V 10/77        (2022.01)
   G06V 10/82        (2022.01)

(56)                References Cited

U.S. PATENT DOCUMENTS

| | | | | |
|---|---|---|---|---|
| 2021/0097345 | A1* | 4/2021 | Goldstein | ................. G06N 3/08 |
| 2021/0174196 | A1* | 6/2021 | Desmond | ............ G06F 18/2321 |
| 2021/0182618 | A1* | 6/2021 | Hoffmann | ............... G06N 3/091 |
| 2021/0264300 | A1* | 8/2021 | Staudinger | ........... G06V 10/762 |
| 2022/0076164 | A1* | 3/2022 | Conort | .................... G06N 20/00 |
| 2022/0301173 | A1* | 9/2022 | Cheng | ..................... G06F 18/22 |
| 2023/0095533 | A1* | 3/2023 | Wong | ................... G06V 10/761 |
| | | | | 382/181 |
| 2024/0232699 | A1* | 7/2024 | Shanker | ................. G06N 20/00 |

OTHER PUBLICATIONS

Hsu, K. et al., "Unsupervised Learning via Meta-Learning," Proceedings of "Workshop on Meta-Learning at NeurIPS", Dec. 8, 2018, Montréal, Canada, 5 pages.

European Patent Office, Extended European Search Report Issued in Application No. 23217684.2, May 24, 2024, Germany, 6 pages.

* cited by examiner

100 —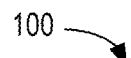

| COLLECT INPUT DATA RELATED TO AT LEAST A PORTION OF AN OBJECT OR AN ENVIRONMENT FROM AN INPUT SENSOR 102 |
|---|

↓

| EXECUTE A FEATURE EXTRACTOR TO EXTRACT FEATURES FOR A PLURALITY OF DATA ELEMENTS OF THE INPUT DATA 104 |
|---|

↓

| EXECUTE A CLUSTERING MODEL CONFIGURED TO CLUSTER THE PLURALITY OF DATA ELEMENTS OF THE INPUT DATA INTO A PLURALITY OF FEATURE CLUSTERS BASED ON SIMILARITIES OF THE EXTRACTED FEATURES TO EACH OTHER 106 |
|---|

↓

| LABEL A PLURALITY OF TARGET CLUSTERS OF THE PLURALITY OF FEATURE CLUSTERS AND A PLURALITY OF DATA ELEMENTS OF THE PLURALITY OF TARGET CLUSTERS WITH RESPECTIVE PREDETERMINED LABELS 108 |
|---|

↓

| GENERATE A TRAINING DATASET INCLUDING THE PLURALITY OF DATA ELEMENTS OF THE PLURALITY OF TARGET CLUSTERS 110 |
|---|

↓

| TRAIN A MACHINE LEARNING MODEL USING THE TRAINING DATASET TO PREDICT A LABEL FOR AN INFERENCE TIME INPUT DATA ELEMENT AT INFERENCE TIME 112 |
|---|

FIG. 10

SYSTEM AND METHOD FOR TRAINING A MACHINE LEARNING MODEL

CROSS REFERENCE TO RELATED APPLICATIONS

This application claims priority to U.S. Provisional Patent Application No. 63/481,151, entitled SYSTEM AND METHOD FOR TRAINING A MACHINE LEARNING MODEL, filed Jan. 23, 2023, the entirety of which is hereby incorporated herein by reference for all purposes.

FIELD

The field of the present disclosure relates generally to machine learning systems and, more specifically, to systems and methods for training machine learning models.

BACKGROUND

In varied applications, including autonomous vehicles, quality inspection, surveillance camera systems, security monitoring systems, logistics and asset tracking, and path finding and navigation systems, large sets of visual data are clustered for object detection. However, clustering visual data is challenging, and often utilizes humans who provide ground truth labels for the image data. Labeling of large-scale data sets of image data generally has to be done on an image-by-image basis, which is both costly and time consuming. Various challenges exist to training machine learning models to perform object detection and feature extraction in such image data. For example, training of a machine learning system can be frustrated if the image dataset is not (a) diverse (incorporating various views and angles of an object), (b) specific (which can be difficult if the object's visual representation changes over time or if different environmental conditions occur), and (c) accurate (which can be problematic due to unintended bias by human labelers, judgment of classes, and data mismatch). Errors and mistakes of these types in datasets, tied to human involvement, can result in false positives and/or negatives.

SUMMARY

In view of the above, a computing system is provided, comprising an input sensor, a processor, and a memory storing executable instructions that, in response to execution by the processor, cause the processor to collect input data related to at least a portion of an object or an environment from the input sensor, execute a feature extractor to extract features for a plurality of data elements of the input data, execute a clustering model configured to cluster the plurality of data elements of the input data into a plurality of feature clusters based on similarities of the extracted features to each other, label a plurality of target clusters of the plurality of feature clusters and a plurality of data elements of the plurality of target clusters with respective predetermined labels, generate a training dataset including the plurality of data elements of the plurality of target clusters, and train a machine learning model using the training dataset to predict a label for an inference time input data element at inference time. The respective predetermined labels of the plurality of target clusters correspond to prediction labels of the machine learning model configured to recognize elements of the object or the environment.

The features, functions, and advantages that have been discussed can be achieved independently in various embodiments or can be combined in yet other embodiments further details of which can be seen with reference to the following description and drawings.

BRIEF DESCRIPTION OF THE DRAWINGS

FIG. 10 is a flowchart of a first computerized method for training a machine learning model according to an example embodiment of the present disclosure.

DETAILED DESCRIPTION

In view of the above issues, the present disclosure describes a system and method for training a machine learning model by efficiently generating a diverse, specific, and accurate training dataset with reduced computing resources. Such a system and method are described below in further detail.

Figure 1:
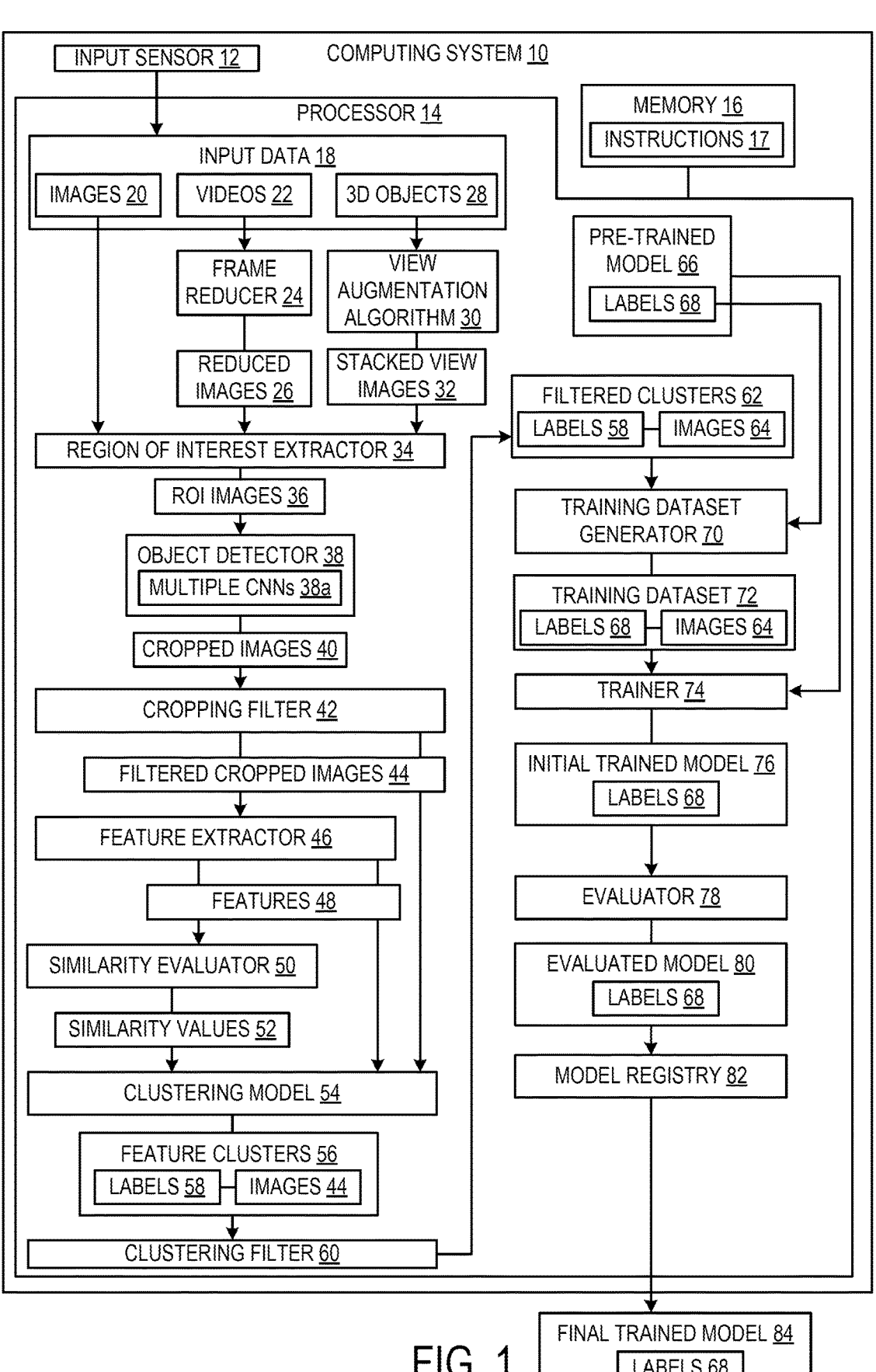
FIG. 1 illustrates a schematic view of a computing system according to an example embodiment of the present disclosure.

Referring to FIG. 1, an embodiment of a computing system 10 is depicted, comprising, by way of non-limiting example, an input sensor 12, processor 14, and a memory 16 storing executable instructions 17 that, in response to execution by the processor 14, cause the processor 14 to collect input data 18 related to at least a portion of an object or an environment from the input sensor 12, execute a feature extractor 46 to extract features 48 for a plurality of data elements 20, 26, 32 of the input data 18, execute a clustering model 54 configured to cluster the plurality of data elements 20, 26, 32 of the input data 18 into a plurality of feature clusters 56 based on similarities 52 of the extracted features 48 to each other, label a plurality of target clusters 62 of the plurality of feature clusters 56 and a plurality of data elements 64 of the plurality of target clusters 62 with respective predetermined labels 58, generate a training dataset 72 including the plurality of data elements 64 of the plurality of target clusters 62, and train a machine learning model 66 using the training dataset 72 to predict a label 68 for an inference time input data element at inference time. The respective predetermined labels 58 of the plurality of target clusters 62 correspond to prediction labels 68 of the machine learning model 66 configured to recognize elements of the object or the environment. In one particular example, the object is all or a portion of an aeronautical or space vehicle such as an aircraft, rocket, or satellite, and the environment is an aeronautical or space environment in which such an aeronautical or space vehicle is manufactured or used.

In configurations in which the input data 18 is image data, the computing system 10 comprises, by way of non-limiting example, a camera 12, processor 14, and a memory 16 storing executable instructions 17 that, in response to execution by the processor 14, cause the processor 14 to collect image data 18 related to at least a portion of an object or an environment from the camera 12, perform object detection to crop images 20, 26, 32 of the image data 18 to generate a plurality of cropped images 40 capturing detected objects, execute a feature extractor 46 to extract features 48 for a plurality of cropped images 40 of the image data 18, execute a clustering model 54 configured to cluster the plurality of cropped images 44 of the image data 18 into a plurality of feature clusters 56 based on similarities 52 of the extracted features 48 to each other, label a plurality of target clusters 62 of the plurality of feature clusters 56 and a plurality of cropped images 64 of the plurality of target clusters 62 with respective predetermined object labels 58, generate a training dataset 72 including the plurality of cropped images 64 of the plurality of target clusters 62, and train an object detection machine learning model 66 using the training dataset 72 to predict an object label 68 for an inference time image at inference time. The respective predetermined object labels 58 of the plurality of target clusters 62 correspond to prediction object labels 68 of the object detection machine learning model 66 configured to recognize elements of the object or the environment.

FIG. 1 depicts a computing system 10 in which input data 18 from the input sensor 12 is inputted and used to train a machine learning model configured to detect objects in the images 20, 26, 32 of the input data 18. The input sensor 12 can be configured as a camera, such as an RGB or infrared camera, for example. Although visual data, including images, videos 22, and 3-D objects 28 are included in the input data 18 in the example of FIG. 1, it will be appreciated that the present invention is not limited to raw visual data, and other types of input data 18 can be processed by the computing system 10, including raw text data, raw graph data, raw audio data, and raw 3-D documents or files, for example. In examples in which the input data 18 is raw text data, the data elements 64 can be word tokens, and the features 48 can be token embeddings, among other options. In examples in which the input data 18 is graph data, the data elements 64 can be graph vectors, and the features 48 can be graph vector embeddings, node embeddings, and/or edge embeddings, which may be used together or separately for clustering the graph data and training a pre-trained model to predict graph elements. In examples in which the input data 18 is raw audio data, the data elements 64 can be audio chunks, and the features 48 can be audio chunk embeddings, among other options.

Figure 2:
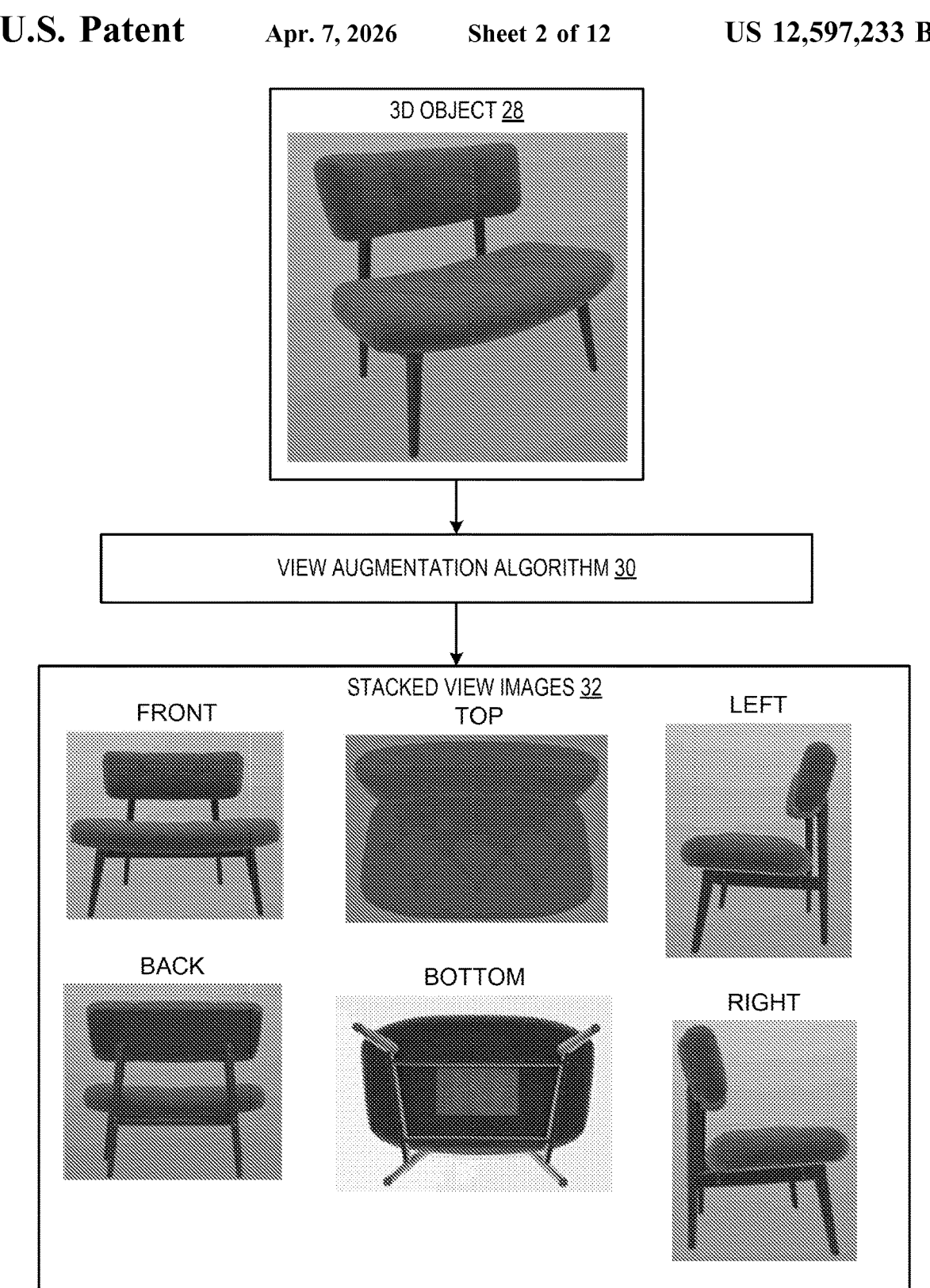
FIG. 2 illustrates operations of the view augmentation algorithm of the computing system of FIG. 1.

The videos 22 of the input data 18 can be processed by a frame reducer 24 to generate reduced images 26 with reduced frames. A view augmentation algorithm 30 can process the 3-D objects 28 and generate stacked view images 32. Turning briefly to FIG. 2, an example is depicted of a 3-D object 28 of a chair, which is processed by a view augmentation algorithm 30 to extract 2D stacked view images 32 depicting different views of the 3-D object 28. The view augmentation algorithm 30 rotates the 3-D object 28 on every axis in predetermined angle intervals when extracting the stacked view images 32 depicting the different views. The stacked view images 32 can be formatted as a tensor file.

Returning to FIG. 1, a region of interest extractor 34 receives the images 20 of the input data 18, the reduced images 26 generated by the frame reducer 24, and the stacked view images 32 generated by the view augmentation algorithm 30. The region of interest extractor 34 then extracts region of interest images 36. For example, the region of interest extractor 34 can perform motion detection for the temporal data of the images 20, 26, 32 including time series data. Motion detection can be performed so that only a select number of images in the input data 18 is analyzed, without analyzing an entire set of the images 20, 26, 32 in the input data 18 data, thereby conserving computing resources.

In the region of interest extractor 34, a structural similarity index measurement (SSIM) algorithm can be used to implement motion detection, in which motion is detected based on the images' pixel changes which are evaluated based on a similarity score between zero and one. The similarity score evaluates a similarity between the pixels of pairs of images from two different points in time. When the similarity score falls below a predetermined score threshold, so that the visual content (pixel values) between the pairs of images is sufficiently different from each other, then the system determines that motion has been detected. The pairs of images with similarity scores that exceed the predetermined score threshold are ignored by the region of interest extractor 34. Accordingly, the total number of images that are subsequently processed can be reduced, thereby reducing processing times and saving computing resources. Alternatively a different similarity algorithm may be used instead of the SSIM algorithm, such as an algorithm that computes the Euclidean distance, Manhattan distance, Minkowski distance, Hausdorff distance, Jaccard distance, etc., between two regions of interest images 36.

Figure 3:
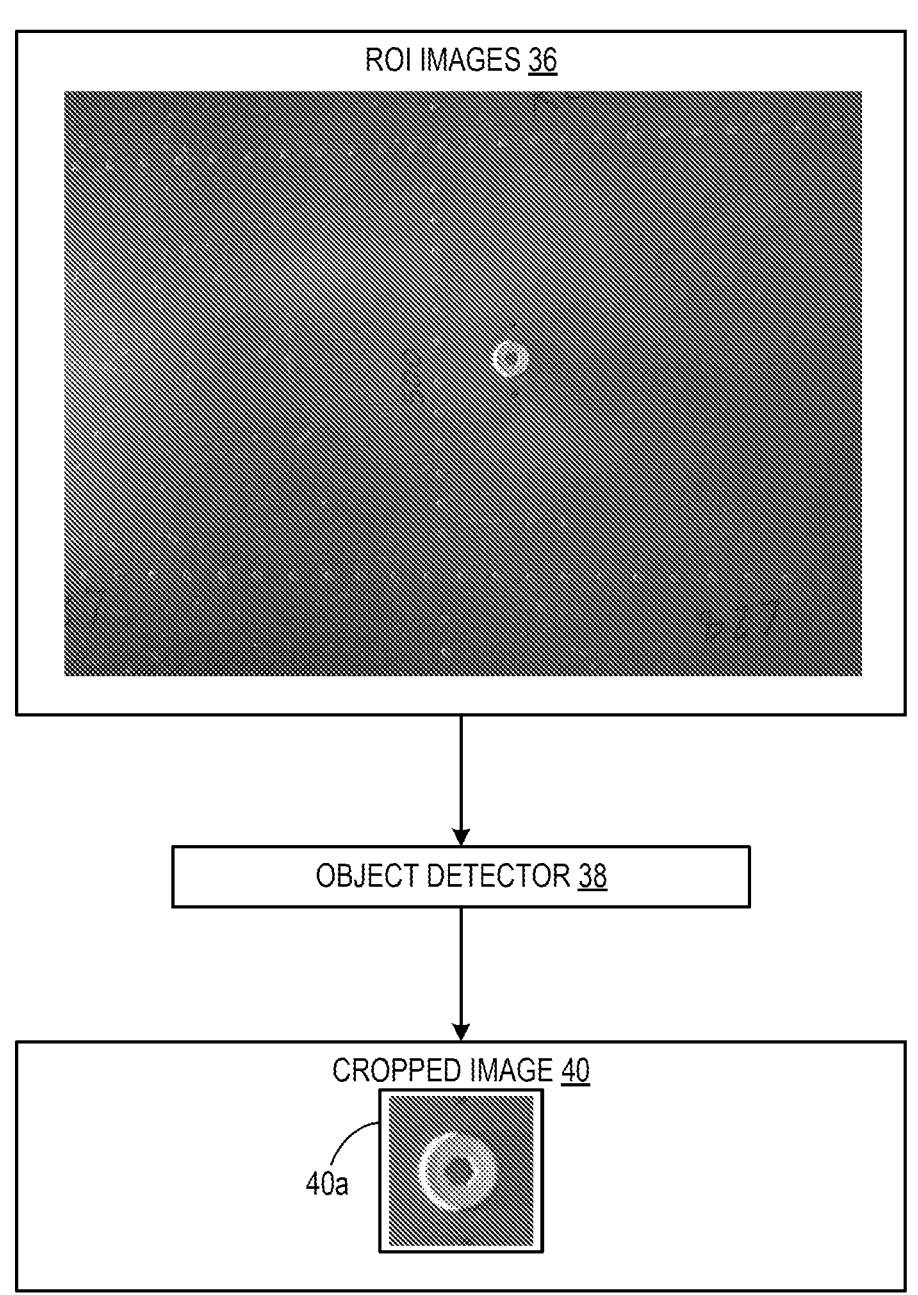
FIG. 3 illustrates operations of the object detector of the computing system of FIG. 1.

The region of interest images 36 that are extracted by the region of interest extractor 34 are subsequently processed by an object detector 28 comprising multiple convolutional neural network (CNN) layers 38a, which are configured to place bounding boxes over any detected objects. The classification layer of the CNN (the last layer of the CNN) can be omitted in the object detector 28 so that object classification is not performed by the multiple CNNs 38a. Turning briefly to FIG. 3, an example is depicted of a region of interest image 36 of an aircraft skin in which a rivet is detected by the object detector 38. Accordingly, the object detector 38 places a bounding box 40a over the detected rivet and generates a cropped image 40 capturing the detected rivet. The bounding box 40a can have a coordinate over the image 36.

Returning to FIG. 1, the cropped images 40 are filtered based on aspect ratio and/or pixel size before the feature extractor 46 extracts the features 48 from the cropped images 40. The cropping filter 42 is configured to filter the cropped images 40 to only allow filtered cropped images 44 to be processed by the feature extractor 46. The cropped images 40 can be filtered by horizontal aspect ratio, which is the ratio of the width to the height of the cropped image 40, or filtered by vertical aspect ratio, which is the ratio of the height to the width of the cropped image 40. Cropped images 40 with horizontal aspect ratios above a predetermined threshold (2 pixels by 220 pixels, for example) can be filtered out, so that elongated cropped images 40 are not processed any further. Additionally or alternatively, cropped images 40 can be filtered by pixel size, so that croppings that are smaller than a predetermined number of pixels, such as 3 pixels, can be filtered out, so that extraneous cropped images 40 are not processed any further.

A feature extractor 46 receives the filtered cropped images 44 as input and extracts features 48 or embeddings of the filtered cropped images 44. The extracted features 48 comprise feature vectors with multiple layers and attributes. Each of the multiple layers can have a normalized value between zero and one, for example. A similarity evaluator 50 then calculates pairwise similarity values 52 between the extracted features 48 of the filtered cropped images 44. The similarity values 52 can be calculated using a cosine similarity metrics function to determine cosine distance, for example. The cosine similarity metrics function has been found to produce superior results for visual data. Alternatively, in other scenarios other distance measures, such as Manhattan distance, Minkowski distance, Hausdorff distance, Jaccard distance, etc., could be utilized.

A clustering model 54 receives the filtered cropped images 44, the extracted features 48 corresponding to the filtered cropped images 44, and the pairwise similarity values 52 as input, and performs clustering of the extracted features 48 in a latent space. Feature pairs with pairwise similarity values 52 that are greater than a predetermined threshold can be assigned into a cluster. The feature clusters 56 outputted by the clustering model 54 has a plurality of feature clusters 56 and images 44 of the plurality of feature clusters 56 which are labeled with respective predetermined labels 58. A clustering filter 60 filters out the feature clusters 56 further to output filtered clusters 62 and a smaller set of images 64 which are labeled with the respective predetermined labels 58.

Figure 4:
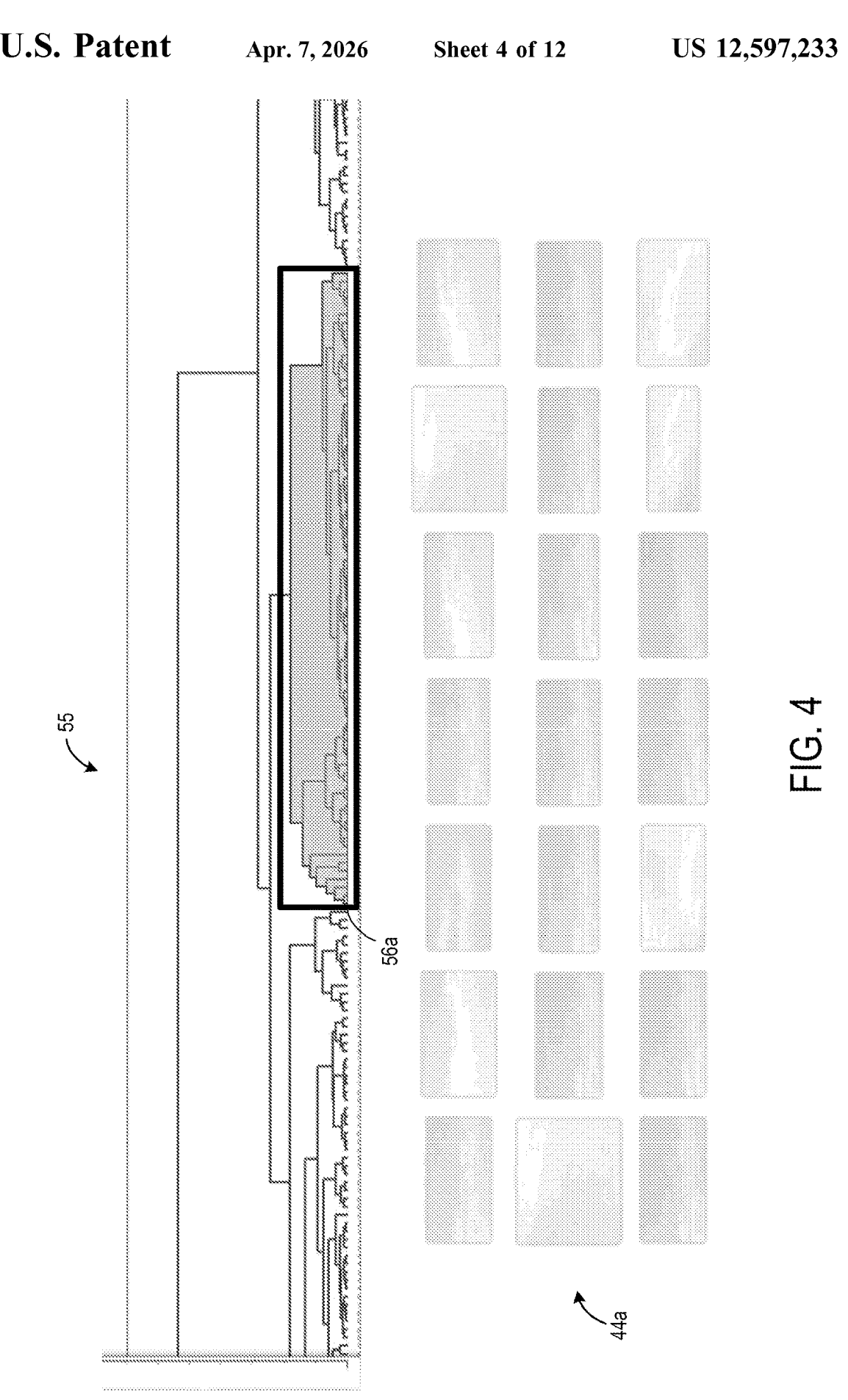
FIG. 4 illustrates an exemplary first feature cluster generated by the computing system of FIG. 1.

The evaluation of pairwise similarity values 52 can be performed using a hierarchical clustering method. Turning to FIG. 4, a hierarchical clustering method can be used to organize the filtered cropped images 44 into a hierarchy 55 of filtered cropped images 44, in which the filtered cropped images 44 are linked to each other via linkages. Filtered cropped images 44 with average pairwise similarity values that are relatively higher are linked more closely together than clusters with average pairwise similarity values that are relatively lower. In the example of FIG. 4, when a given set of linkages is below a first predetermined height ratio threshold, within a first predetermined height ratio range, the filtered cropped images 44 associated with the given set of linkages are assigned into a first cluster 56a comprising images 44a of the sky.

Figure 5:
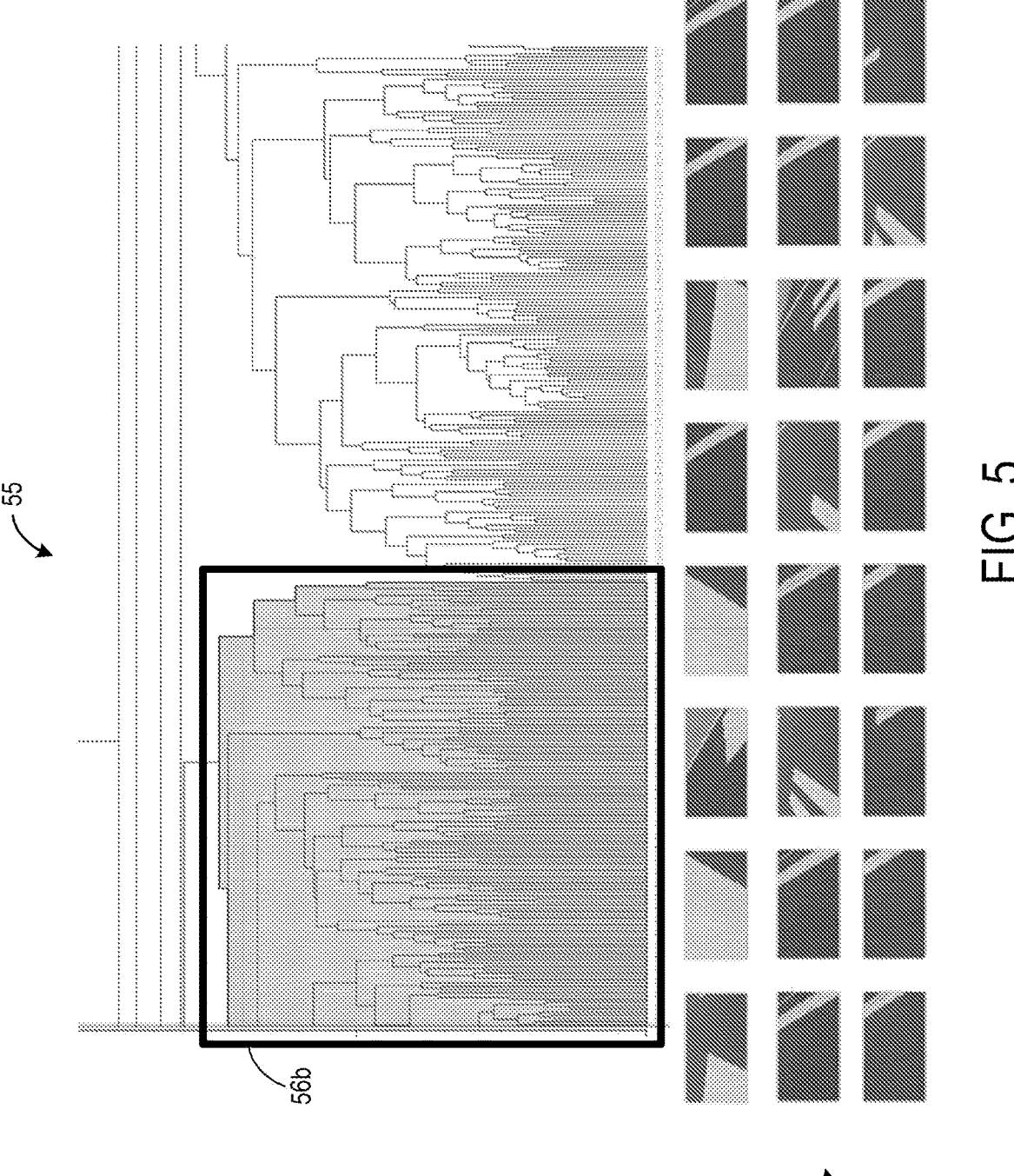
FIG. 5 illustrates an exemplary second feature cluster generated by the computing system of FIG. 1.

Turning to FIG. 5, the hierarchy 55 of filtered cropped images 44 is analyzed to assign into a second cluster 56b a group of filtered cropped images 44 that are linked to each other with a given set of linkages that is within a second predetermined height ratio range, or below a second predetermined height ratio threshold that is higher than the second predetermined height ratio threshold. In the example of FIG. 5, the second cluster 56b comprises images 44b of a runway.

Figure 6:
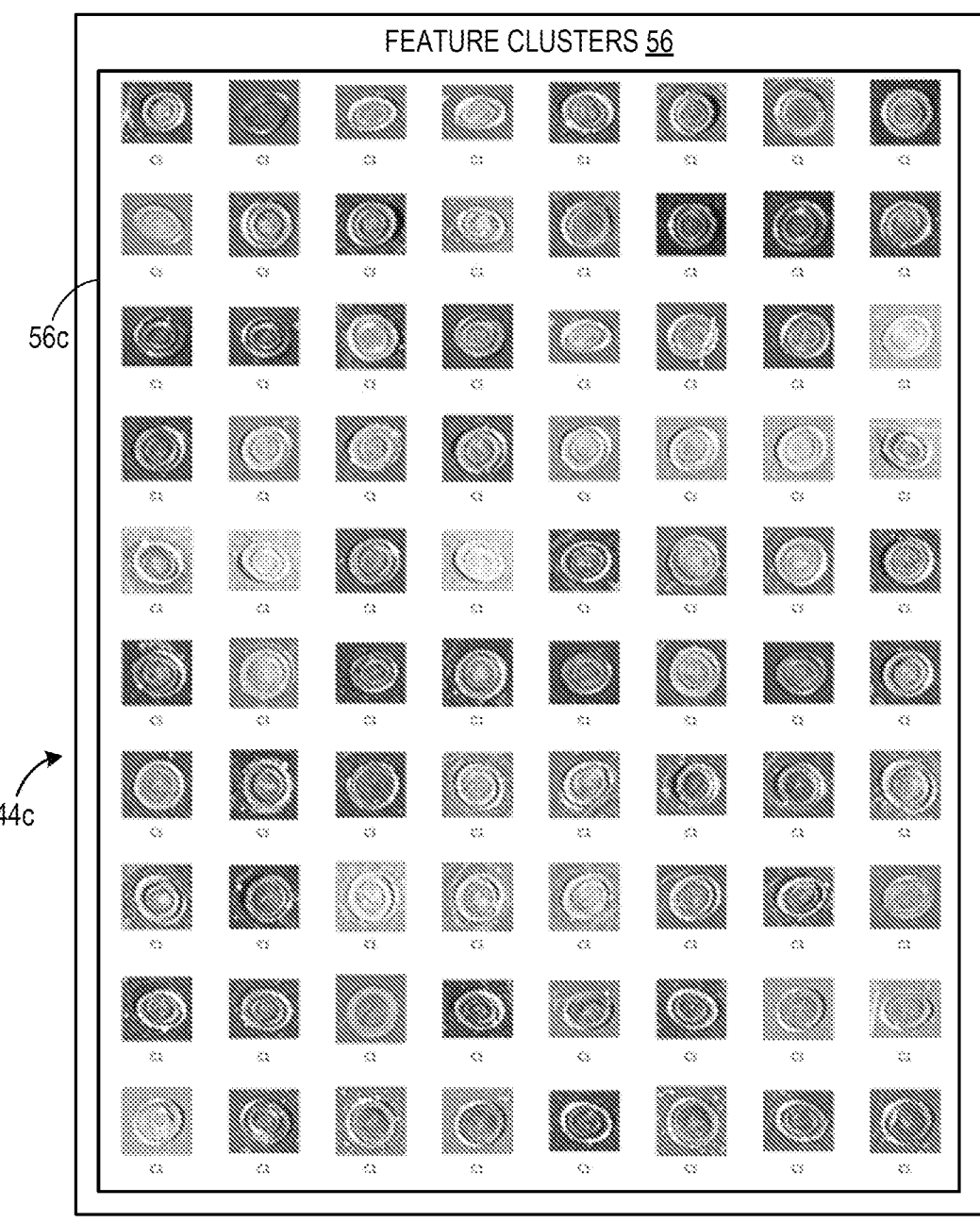
FIG. 6 illustrates an exemplary third feature cluster generated by the computing system of FIG. 1.
Figure 7:
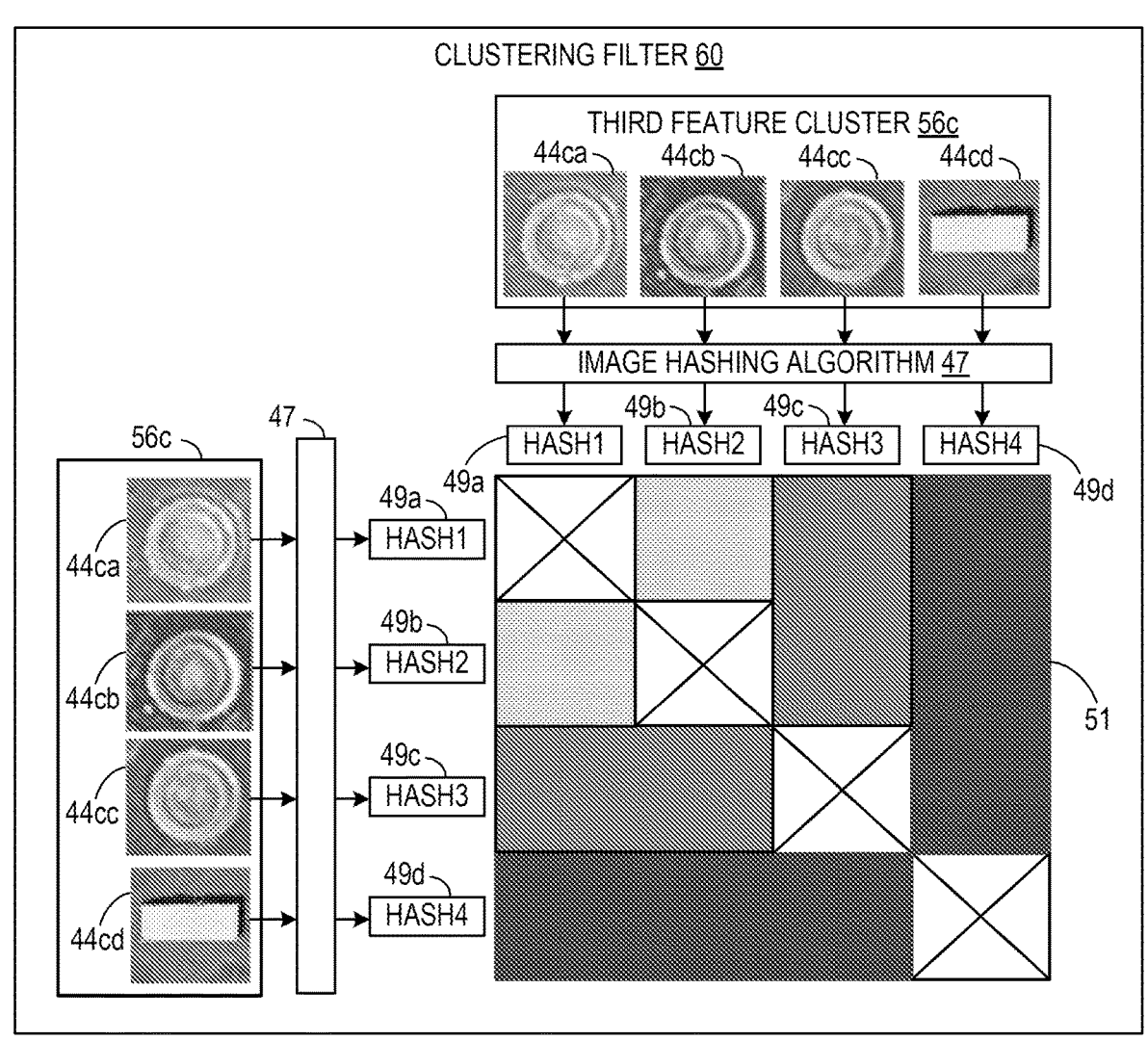
FIG. 7 illustrates an exemplary operation of the clustering filter of the computing system of FIG. 1.

Turning to FIG. 6, an example of a third feature cluster 56c is depicted, in which images 44c of rivets are clustered together. Turning to FIG. 7, exemplary operations of the clustering filter 60 are described, in which outlier images among the images 44c in the third feature cluster 56c are identified and discarded from the third feature cluster 56c. The clustering filter 60 can implement an image hashing algorithm 47, in which a hash 49a-d for each respective image 44ca-cd is computed within a given cluster 56c. In this example, the image hashing algorithm 47 calculates a first hash 49a for the first image 44ca, a second hash 49b for the second image 44cb, a third hash 49c for the third image

44cc, and a fourth hash for the fourth image 44cd. The imaging hashing algorithm 47 is preferably a perceptual hashing algorithm, but other known hashing techniques can alternatively be implemented, including average hashing, wavelet hashing, or other known hashing techniques. One perceptual hashing algorithm that may be utilized in this implementation is the pHash algorithm, which uses a discrete cosine transform to extract the relevant channels from the image and compute the hash based on the 8×8 discrete cosine transform result. The computed hash outputted by the pHash algorithm is a vector of floating point values.

Using a distance matrix 51, pairwise distances between the hash for a given image and the hashes for the rest of the images in the given cluster are calculated. In the graphical depiction of the distance matrix 51 in FIG. 7, the lighter colored squares indicate relatively smaller distances between the pairs of hashes, while the darker colored squares indicate relatively greater distances between the pairs of hashes. After the pairwise distances between the hashes are calculated, pairs of images with pairwise distances which exceed a predetermined distance threshold are identified. When it is determined that an average pairwise distance between the hash for a given image and the hashes for the rest of the images in the given cluster exceed a predetermined distance threshold, then the given image is discarded from the given cluster. In other words, based on the identification of the pairs of images with pairwise distances which exceed the predetermined threshold, the outlier images are identified and discarded from the given cluster.

The predetermined distance threshold can be set based on a distribution of distances. As one example, the predetermined distance threshold can be set as $\mu\pm3\sigma$ for a 95% confidence interval. The distance matrix 51 can preferably calculate the pairwise distances between the hashes 49a-d of the images 44ca-cd as XOR distances, in which an XOR operation is performed on binary values of the hashes of a pair of images, and the number of 1's in the result is calculated as the distance. However, other distances can alternatively be calculated, including Euclidean distances and Hamming distances.

In the example of FIG. 6, three of the images 44ca, 44cb, 44cc within the third feature cluster 56c are oval-shaped, and only one image 44cd within the third feature cluster 56c is rectangularly shaped. As shown in the distance matrix 51, the distances between the hash 49d for the rectangularly shaped image 44cd and the hashes 49a-c for the other images 44ca-cc is relatively greater (as indicated by squares with darker colors) than the distances between pairs of hashes 49a-c among the oval-shaped images 44ca-cc which are relatively smaller (as indicated by squares with lighter colors). In other words, the pairwise distances between hashes 49a-c for the oval-shaped images 44ca-cc and the hash 49d for the rectangularly shaped image 44cd are greater than the pairwise distances among the hashes 49a-c of pairs of oval-shaped images 44ca-cc. Accordingly, the rectangularly shaped image 44cd can be easily identified within the given cluster 56c as an outlier image and subsequently discarded.

Figure 8:
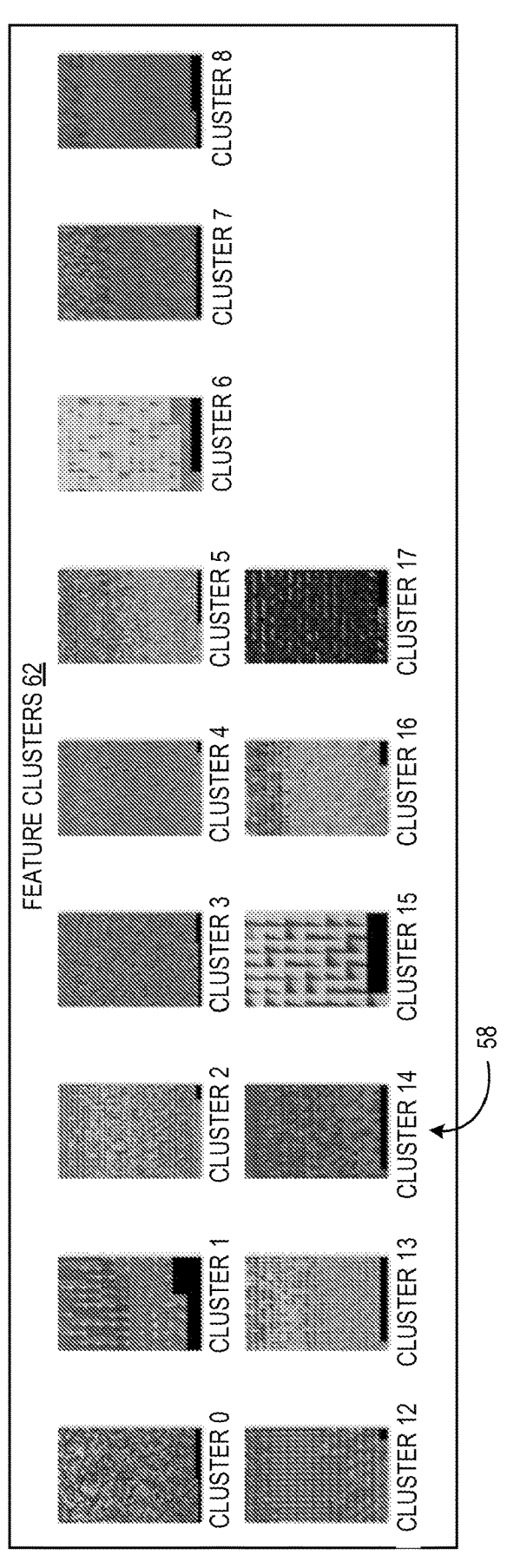
FIG. 8 illustrates some exemplary filtered feature clusters generated by the computing system of FIG. 1.
Figure 9:
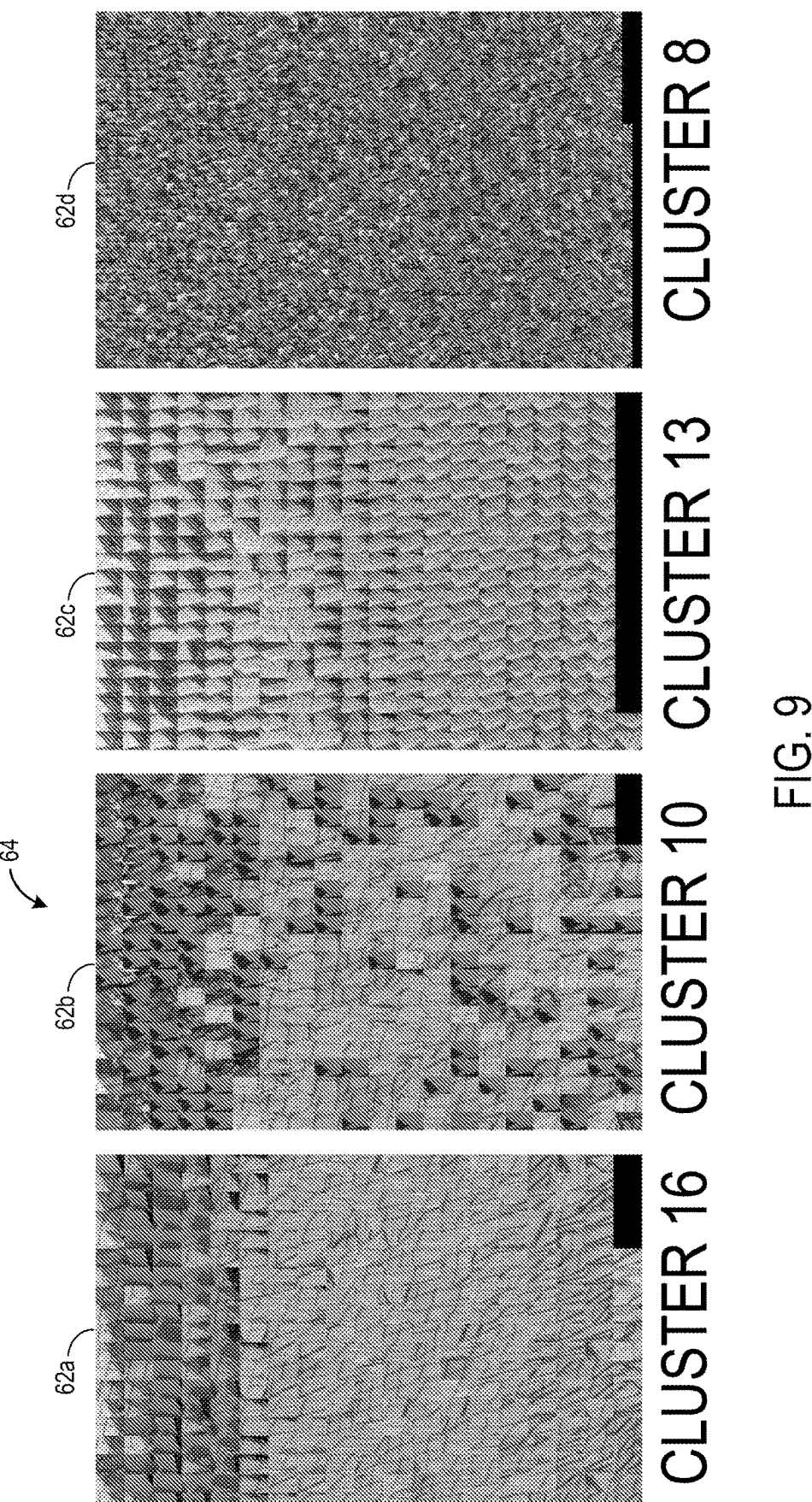
FIG. 9 illustrates a magnified view of some exemplary filtered feature clusters generated by the computing system of FIG. 1.

Turning to FIG. 8, filtered feature clusters 62 are shown, in which the clustering model 54 has labeled a plurality of target clusters 62 of the plurality of feature clusters 56 and images 64 of the plurality of target clusters 62 with respective predetermined labels 58, which are numerically labeled as 'cluster 0', 'cluster 1', and so forth in this example. Turning to FIG. 9, a magnified view of four of the feature clusters 62*a-d* is depicted, in which the images 64 of the plurality of target clusters 62 are more clearly visible.

Returning to FIG. 1, the filtered clusters 62, including the images 64 and the respective predetermined labels 58, are inputted into a training dataset generator 70 to generate a training dataset 72 based on a standard training dataset format, which can be Yolo or Coco, for example. The training dataset generator 70 replaces the predetermined labels 58 of the filtered clusters 62 with predetermined labels 68 from a pre-trained model 66 by matching the clusters of the pre-trained model 66 with the filtered clusters 62 generated by the clustering model 54 using an inference algorithm. The generated training dataset 72 includes the filtered clusters 62 and images 64 from the filtered clusters 62 which are labeled with labels 68 from the pre-trained model 66. The pre-trained model 66 can be based on a convolutional neural network.

A trainer 74 then trains the pre-trained model 66 using the generated training dataset 72, performing hyper-parameter fine-tuning for all clusters included in the training dataset 72. The initially trained model 76 is then evaluated with an evaluator 78. The evaluated model 80 is then registered in a model registry 82 and then deployed as a final trained model 84 on a user's computing device for object detection. Accordingly, the training of the pre-trained model 66 can be automated with minimal to no human involvement in supervising the training process.

The above-described computing system can be applied in quality inspections to detect features on an aircraft skin such as scratches, rivets, dents, cracks, etc. For example, an object detector 38 configured to detect scratches on aircraft skin can generate cropped images 40 of scratches on the aircraft skin. Filtered cropped images 44 of the scratches can be inputted into a clustering model 54, and features 48 of the filtered cropped images 44 can be clustered into feature clusters 56, which are further filtered to generate a training dataset 72, which is used to train a pre-training machine learning model 66 to improve its performance in detecting scratches on images of aircraft skin.

The above-described computing system can also be applied in manufacturing applications to detect other objects that can be manufactured by a given manufacturing process, for example. For example, 3D objects 28 of various objects can be processed by the view augmentation algorithm 30 to generate stacked view images 32 of the various objects. When the stacked view images 32 are cropped and filtered, and then features 48 are extracted to cluster the stacked view images 32 using the clustering model 54, the stacked view images 32 of objects with similar three-dimensional geometries would tend to cluster together. By identifying objects with similar three-dimensional geometries, the identification of objects that can be manufactured by a given manufacturing process can be facilitated while conserving computing resources.

Turning to FIG. 10, a flowchart is illustrated of a first computerized method 100 for training a machine learning model. The following description of the first computerized method 100 is provided with reference to the software and hardware components described above and shown in FIGS. 1-3. It will be appreciated that first computerized method 100 also can be performed in other contexts using other suitable hardware and software components.

Step 102 is performed to collect input data related to at least a portion of an object or an environment from an input sensor. Step 104 is performed to execute a feature extractor to extract features for a plurality of data elements of the input data. Step 106 is performed to execute a clustering model configured to cluster the plurality of data elements of the input data into a plurality of feature clusters based on similarities of the extracted features to each other. Step 108 is performed to label a plurality of target clusters of the plurality of feature clusters and a plurality of data elements of the plurality of target clusters with respective predetermined labels. Step 110 is performed to generate a training dataset including the plurality of data elements of the plurality of target clusters. Step 112 is performed to train a machine learning model using the training dataset to predict a label for an inference time input data element at inference time.

Figure 11:
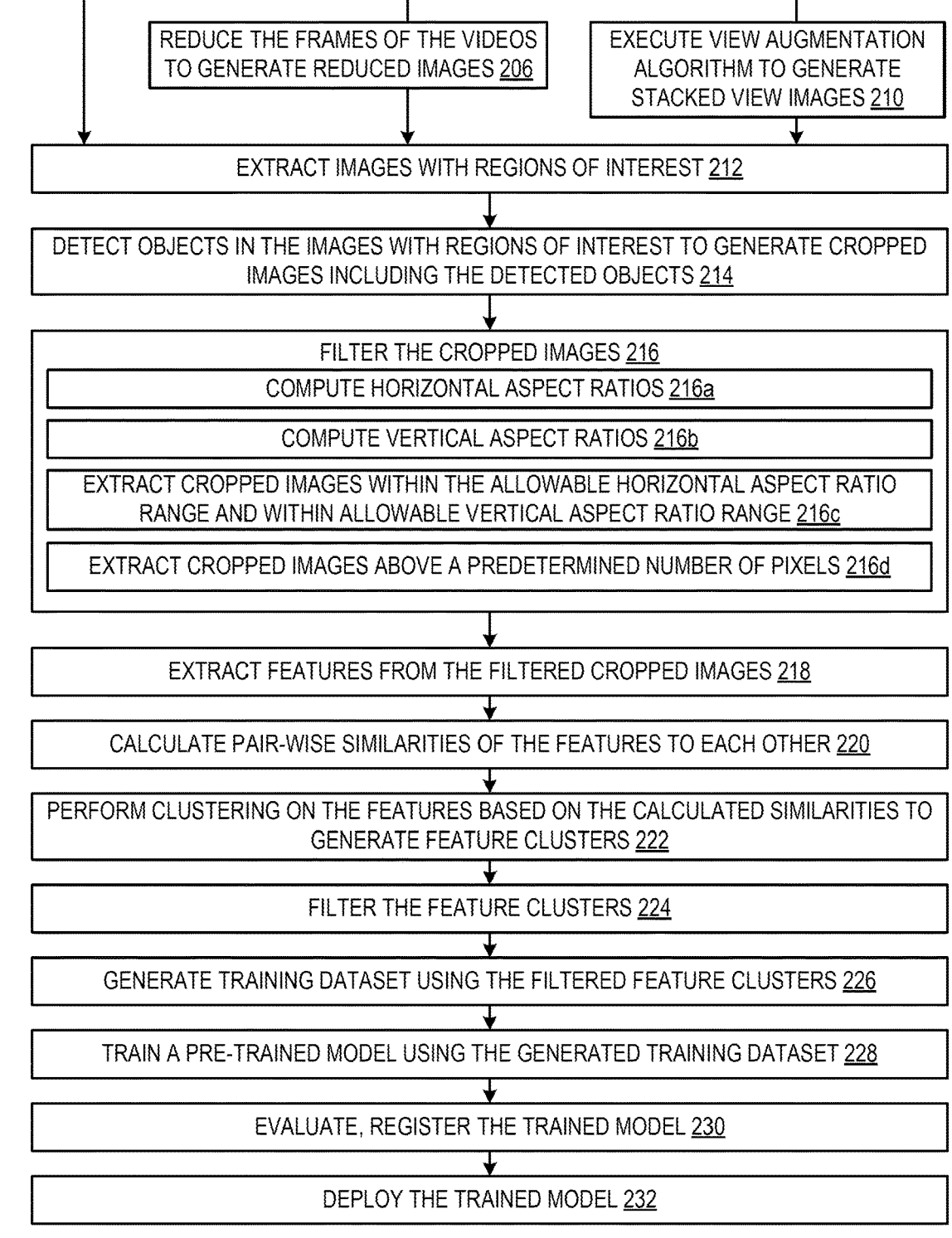
FIG. 11 is a flowchart of a second computerized method for training a machine learning model according to an example embodiment of the present disclosure.

Turning to FIG. 11, a flowchart is illustrated of a second computerized method 200 for training a machine learning model. The following description of the second computerized method 200 is provided with reference to the software and hardware components described above and shown in FIGS. 1-3. It will be appreciated that the second computerized method 200 also can be performed in other contexts using other suitable hardware and software components.

At step 202, images are received. At step 204, videos are received. At step 206, the frames of the videos are reduced to generate reduced images. At step 208, 3-D objects are received. At step 210, a view augmentation algorithm is executed on the 3-D objects to generate stacked view images.

At step 212, images with regions of interest are extracted from the received images, reduced images, and stacked view images. At step 214, objects are detected in the images with regions of interest to generate cropped images including the detected objects. At step 216, the cropped images are filtered. Step 216 can include, by way of non-limiting example, step 216*a* of computing horizontal aspect ratios, step 216*b* of computing vertical aspect ratios 216*b*, step 216*c* of extracting cropped images within an allowable horizontal aspect ratio range and within an allowable vertical aspect ratio range and/or step 216*d* of extracting cropped images above a predetermined number of pixels.

At step 218, features are extracted from the filtered cropped images. At step 220, pairwise similarities of the features to each other are calculated. At step 222, clustering is performed on the features based on the calculated similarities to generate feature clusters. At step 224, the feature clusters are filtered. At step 226, a training dataset is generated using the filtered feature clusters. At step 228, a pre-trained model is trained using the generated training dataset. At step 230, the training model is trained and registered in a model registry. At step 232, the trained model is deployed on the user's computing device.

The above-described system and method are configured to train a machine learning model by efficiently generating a diverse, specific, and accurate training dataset with reduced computing resources.

Figure 12:
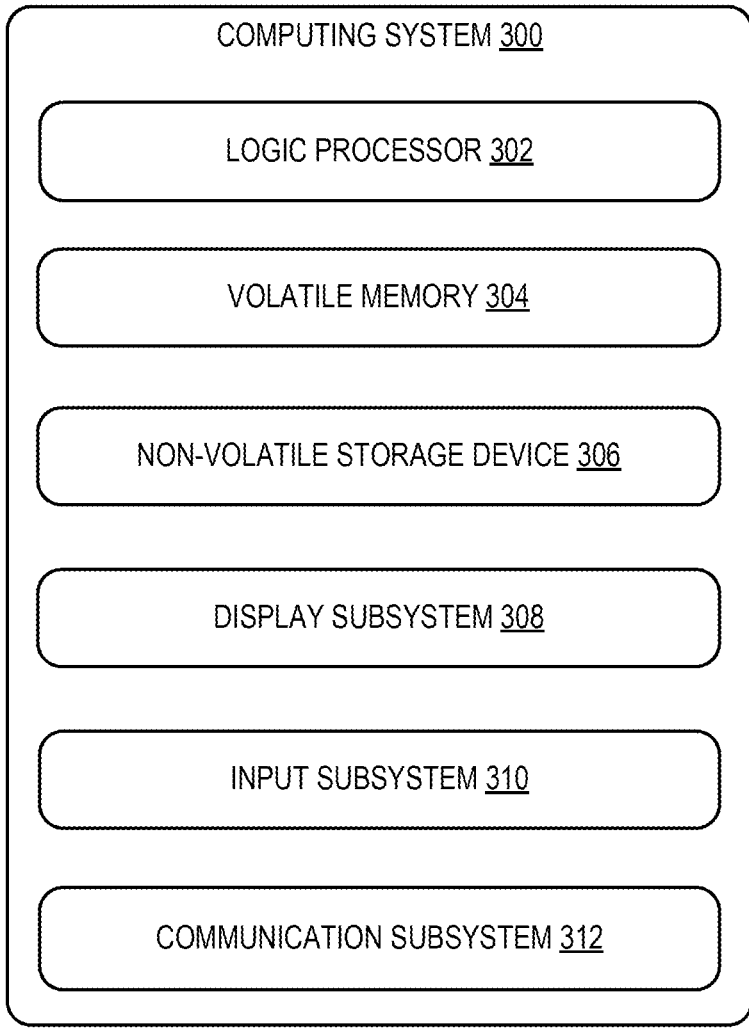
FIG. 12 shows an embodiment of an example computing environment of the present disclosure.

FIG. 12 schematically shows a non-limiting embodiment of a computing system 300 that can enact one or more of the methods and processes described above. Computing system 300 is shown in simplified form. Computing system 300 can embody the computing system 10 illustrated in FIG. 1. Computing system 300 can take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 300 includes a logic processor 302, volatile memory 304, and a non-volatile storage device 306. Computing system 300 can optionally include a display subsystem 308, input subsystem 310, communication subsystem 312, and/or other components not shown in FIG. 12.

Logic processor 302 includes one or more physical devices configured to execute instructions. For example, the logic processor can be configured to execute instructions that are part of one or more applications, programs, routines, libraries, objects, components, data structures, or other logical constructs. Such instructions can be implemented to perform a task, implement a data type, transform the state of one or more components, achieve a technical effect, or otherwise arrive at a desired result.

The logic processor 302 can include one or more physical processors (hardware) configured to execute software instructions. Additionally or alternatively, the logic processor can include one or more hardware logic circuits or firmware devices configured to execute hardware-implemented logic or firmware instructions. Processors of the logic processor 302 can be single-core or multi-core, and the instructions executed thereon can be configured for sequential, parallel, and/or distributed processing. Individual components of the logic processor optionally can be distributed among two or more separate devices, which can be remotely located and/or configured for coordinated processing. Aspects of the logic processor can be virtualized and executed by remotely accessible, networked computing devices configured in a cloud-computing configuration. In such an example, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 306 can be transformed—e.g., to hold different data.

Non-volatile storage device 306 can include physical devices that are removable and/or built in. Non-volatile storage device 306 can include optical memory (e.g., CD, DVD, HD-DVD, BLU-RAY DISC™, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 can include, by way of non-limiting example, nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 can include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 can be integrated together into one or more hardware-logic components. Such hardware-logic components can include, by way of non-limiting example, field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" can be used to describe an aspect of computing system 300 typically implemented in software by a processor to perform a particular function using portions of volatile memory, which function involves transformative processing that specially configures the processor to perform the function. Thus, a module, program, or engine can be instantiated via logic processor 302 executing instructions held by non-volatile storage device 306, using portions of volatile memory 304. It will be understood that different modules, programs, and/or engines can be instantiated from the same application, service, code block, object, library, routine, API, function, etc. Likewise, the same module, program, and/or engine can be instantiated by different applications, services, code blocks, objects, routines, APIs, functions, etc. The terms "module," "program," and "engine" can encompass individual or groups of executable files, data files, libraries, drivers, scripts, database records, etc.

When included, display subsystem 308 can be used to present a visual representation of data held by non-volatile storage device 306. The visual representation can take the form of a graphical user interface (GUI). As the herein described methods and processes change the data held by the non-volatile storage device, and thus transform the state of the non-volatile storage device, the state of display subsystem 308 can likewise be transformed to visually represent changes in the underlying data. Display subsystem 308 can include one or more display devices utilizing virtually any type of technology. Such display devices can be combined with logic processor 302, volatile memory 304, and/or non-volatile storage device 306 in a shared enclosure, or such display devices can be peripheral display devices.

When included, input subsystem 310 can comprise or interface with one or more user-input devices such as a keyboard, mouse, touch screen, or game controller. In some embodiments, the input subsystem can comprise or interface with selected natural user input (NUI) componentry. Such componentry can be integrated or peripheral, and the transduction and/or processing of input actions can be handled on- or off-board. Example NUI componentry can include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 can be configured to communicatively couple various computing devices described herein with each other, and with other devices. Communication subsystem 312 can include wired and/or wireless communication devices compatible with one or more different communication protocols. As non-limiting examples, the communication subsystem can be configured for communication via a wireless telephone network, or a wired or wireless local- or wide-area network, such as a HDMI over Wi-Fi connection. In some embodiments, the communication subsystem can allow computing system 300 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein can represent one or more of any number of processing strategies. As such, various acts illustrated and/or described can be performed in the sequence illustrated and/or described, in other sequences, in parallel, or omitted. Likewise, the order of the above-described processes can be changed.

It will be appreciated that "and/or" as used herein refers to the logical disjunction operation, and thus A and/or B has the following OR truth table.

| A | B | A and/or B |
| --- | --- | --- |
| T | T | T |
| T | F | T |
| F | T | T |
| F | F | F |

To the extent that terms "includes," "including," "has," "contains," and variants thereof are used herein, such terms are intended to be inclusive in a manner similar to the term "comprises" as an open transition word without precluding any additional or other elements.

Further, the disclosure comprises configurations according to the following clauses.

Clause 1. A computing system comprising: an input sensor; a processor; and a memory storing executable instructions that, in response to execution by the processor cause the processor to: collect input data related to at least a portion of an object or an environment from the input sensor; execute a feature extractor to extract features for a plurality of data elements of the input data; execute a clustering model configured to cluster the plurality of data elements of the input data into a plurality of feature clusters based on similarities of the extracted features to each other; label a plurality of target clusters of the plurality of feature clusters and the plurality of data elements of the plurality of target clusters with respective predetermined labels; generate a training dataset including the plurality of data elements of the plurality of target clusters; and train a machine learning model using the training dataset to predict a label for an inference time input data element at inference time, wherein the respective predetermined labels of the plurality of target clusters correspond to prediction labels of the machine learning model configured to recognize elements of the object or the environment.

Clause 2. The computing system of claim 1, wherein the input sensor is a camera; and the plurality of data elements are images.

Clause 3. The computing system of claim 2, wherein an object detector comprising multiple convolutional neural networks is used to crop the images to generate cropped images capturing detected objects; and the feature extractor is executed to extract features from the cropped images.

Clause 4. The computing system of claim 3, wherein a classification layer is omitted from the object detector.

Clause 5. The computing system of claim 3, wherein the cropped images are filtered before the feature extractor extracts the features from the cropped images; and the cropped images are filtered based on aspect ratio and/or pixel size.

Clause 6. The computing system of claim 1, wherein the data elements are clustered into the plurality of feature clusters by calculating pairwise similarity values between the extracted features of the data elements.

Clause 7. The computing system of claim 6, wherein the similarity values are calculated using a cosine similarity metrics function.

Clause 8. The computing system of claim 1, wherein the data elements are clustered into the plurality of feature clusters using a hierarchical clustering method.

Clause 9. The computing system of claim 8, wherein the data elements are linked to each other via linkages; and when a given set of linkages is within a predetermined height ratio range, data elements associated with the given set of linkages are assigned into a target cluster of the plurality of target clusters.

Clause 10. The computing system of claim 1, wherein the respective predetermined labels of the target clusters are replaced by the prediction labels of the machine learning model using an inference algorithm to generate the training dataset.

Clause 11. A method comprising steps to: collect input data related to at least a portion of an object or an environment from an input sensor; execute a feature extractor to extract features for a plurality of data elements of the input data; execute a clustering model configured to cluster the plurality of data elements of the input data into a plurality of feature clusters based on similarities of the extracted features to each other; label a plurality of target clusters of the plurality of feature clusters and a plurality of data elements of the plurality of target clusters with respective predetermined labels; generate a training dataset including the plurality of data elements of the plurality of target clusters; and train a machine learning model using the training dataset to predict a label for an inference time input data element at inference time, wherein the respective predetermined labels of the plurality of target clusters correspond to prediction labels of the machine learning model configured to recognize elements of the object or the environment.

Clause 12. The method of claim 11, wherein the input sensor is a camera; and the plurality of data elements are images.

Clause 13. The method of claim 12, wherein object detection is performed to crop the images to generate cropped images capturing detected objects; and features are extracted from the cropped images.

Clause 14. The method of claim 13, wherein the input data includes 3-D objects; and a view augmentation algorithm is used to process the 3-D objects and generate stacked view images as the plurality of data elements.

Clause 15. The method of claim 13, wherein the cropped images are filtered before the feature extractor extracts the features from the cropped images; and the cropped images are filtered based on aspect ratio and/or pixel size.

Clause 16. The method of claim 11, wherein the data elements are clustered into the plurality of feature clusters by calculating pairwise similarity values between the extracted features of the data elements.

Clause 17. The method of claim 16, wherein the similarity values are calculated using a cosine similarity metrics function.

Clause 18. The method of claim 11, wherein the data elements are clustered into the plurality of feature clusters using a hierarchical clustering method.

Clause 19. The method of claim 11, wherein the respective predetermined labels of the target clusters are replaced by the prediction labels of the machine learning model using an inference algorithm to generate the training dataset.

Clause 20. A computing system comprising: a camera; a processor; and a memory storing executable instructions that, in response to execution by the processor cause the processor to: collect image data related to at least a portion of an object or an environment from the camera; perform object detection to crop images of the image data to generate a plurality of cropped images capturing detected objects; execute a feature extractor to extract features for the plurality of cropped images; execute a clustering model configured to cluster the plurality of cropped images of the image data into a plurality of feature clusters based on similarities of the extracted features to each other; label a plurality of target clusters of the plurality of feature clusters and a plurality of cropped images of the plurality of target clusters with respective predetermined object labels; generate a training dataset including the plurality of cropped images of the plurality of target clusters; and train an object detection machine learning model using the training dataset to predict an object label for an inference time image at inference time, wherein the respective predetermined object labels of the plurality of target clusters correspond to prediction object labels of the object detection machine learning model configured to recognize objects in images of the object or the environment.

The invention claimed is:

1. A computing system for training a machine learning model configured to recognize elements of an object or an environment, the system comprising:
an input sensor;
a processor; and
a memory storing executable instructions that, in response to execution by the processor cause the processor to:
collect input data related to at least a portion of the object or the environment from the input sensor;
execute a feature extractor to extract features for a plurality of data elements of the input data;
execute a clustering model configured to cluster the plurality of data elements of the input data into a plurality of feature clusters based on similarities of the extracted features to each other;
apply a clustering filter on the plurality of feature clusters to output a plurality of target clusters from among the plurality of feature clusters;
label a plurality of target data elements of the plurality of target clusters with respective ground truth predetermined labels for each target cluster;
generate a training dataset by:
matching clusters of the machine learning model with the plurality of target clusters using an inference algorithm, running each target data element of the plurality of target clusters through the machine learning model in inference mode to generate prediction labels; and
replacing the ground truth predetermined labels of the target clusters with the prediction labels generated by the machine learning model, so as to generate the training dataset comprising the plurality of target data elements of the plurality of target clusters labeled with the prediction labels generated by the machine learning model; and
update a training of the machine learning model in a training mode using the training dataset by performing hyper-parameter fine-tuning on the machine learning model for the plurality of target clusters in the training dataset.

2. The computing system of claim 1, wherein the input sensor is a camera; and
the plurality of data elements are images.

3. The computing system of claim 2, wherein
an object detector comprising multiple convolutional neural networks is used to crop the images to generate cropped images capturing detected objects; and the feature extractor is executed to extract features from the cropped images.

4. The computing system of claim 3, wherein a classification layer is omitted from the object detector.

5. The computing system of claim 3, wherein
the cropped images are filtered before the feature extractor extracts the features from the cropped images; and
the cropped images are filtered based on aspect ratio and/or pixel size.

6. The computing system of claim 1, wherein the data elements are clustered into the plurality of feature clusters by calculating pairwise similarity values between the extracted features of the data elements.

7. The computing system of claim 6, wherein the similarity values are calculated using a cosine similarity metrics function.

8. The computing system of claim 1, wherein the data elements are clustered into the plurality of feature clusters using a hierarchical clustering method.

9. The computing system of claim 8, wherein
the data elements are linked to each other via linkages; and
when a given set of linkages is within a predetermined height ratio range, data elements associated with the given set of linkages are assigned into a target cluster of the plurality of target clusters.

10. A method for training a machine learning model configured to recognize elements of an object or an environment, the method comprising steps to:
collect input data related to at least a portion of the object or the environment from an input sensor;
execute a feature extractor to extract features for a plurality of data elements of the input data;
execute a clustering model configured to cluster the plurality of data elements of the input data into a plurality of feature clusters based on similarities of the extracted features to each other;
apply a clustering filter on the plurality of feature clusters to output a plurality of target clusters from among the plurality of feature clusters;
label a plurality of target data elements of the plurality of target clusters with respective ground truth predetermined labels for each target cluster;
generate a training dataset by:
matching clusters of the machine learning model with the plurality of target clusters using an inference algorithm, running each target data element of the plurality of target clusters through the machine learning model in inference mode to generate prediction labels; and
replacing the ground truth predetermined labels of the target clusters with the prediction labels generated by the machine learning model, so as to generate the training dataset comprising the plurality of target data elements of the plurality of target clusters labeled with the prediction labels generated by the machine learning model; and
update a training of the machine learning model in a training mode using the training dataset by performing hyper-parameter fine-tuning on the machine learning model for the plurality of target clusters in the training dataset.

11. The method of claim 10, wherein
the input sensor is a camera; and
the plurality of data elements are images.

12. The method of claim 11, wherein object detection is performed to crop the images to generate cropped images capturing detected objects; and features are extracted from the cropped images.

13. The method of claim 12, wherein the input data includes 3-D objects; and a view augmentation algorithm is used to process the 3-D objects and generate stacked view images as the plurality of data elements.

14. The method of claim 12, wherein the cropped images are filtered before the feature extractor extracts the features from the cropped images; and the cropped images are filtered based on aspect ratio and/or pixel size.

15. The method of claim 10, wherein the data elements are clustered into the plurality of feature clusters by calculating pairwise similarity values between the extracted features of the data elements.

16. The method of claim 15, wherein the similarity values are calculated using a cosine similarity metrics function.

17. The method of claim 10, wherein the data elements are clustered into the plurality of feature clusters using a hierarchical clustering method.

18. A computing system for training an object detection machine learning model configured to recognize objects in images of an object or an environment, the system comprising:

a camera;

a processor; and a memory storing executable instructions that, in response to execution by the processor cause the processor to:

collect image data related to at least a portion of the object or the environment from the camera;

perform object detection to crop images of the image data to generate a plurality of cropped images capturing detected objects;

execute a feature extractor to extract features for the plurality of cropped images;

execute a clustering model configured to cluster the plurality of cropped images of the image data into a plurality of feature clusters based on similarities of the extracted features to each other;

apply a clustering filter on the plurality of feature clusters to output a plurality of target clusters from among the plurality of feature clusters;

label a plurality of cropped target images of the plurality of target clusters with respective ground truth predetermined object labels for each target cluster;

generate a training dataset by:

matching clusters of the object detection machine learning model with the plurality of target clusters using an inference algorithm, running each cropped target image of the plurality of target clusters through the object detection machine learning model in inference mode to generate prediction labels; and replacing the ground truth predetermined object labels of the target clusters with the prediction labels generated by the object detection machine learning model, so as to generate the training dataset comprising the plurality of cropped target images of the plurality of target clusters labeled with the prediction labels generated by the object detection machine learning model; and update a training of the object detection machine learning model in a training mode using the training dataset by performing hyper-parameter fine-tuning on the object detection machine learning model for the plurality of target clusters in the training dataset.

19. The computing system of claim 18, wherein an object detector comprising multiple convolutional neural networks is used to crop the images to generate cropped images capturing detected objects; and the feature extractor is executed to extract features from the cropped images.

20. The computing system of claim 19, wherein a classification layer is omitted from the object detector.

* * * * *